US007264993B2

(12) United States Patent
Berndtsson

(10) Patent No.: US 7,264,993 B2
(45) Date of Patent: Sep. 4, 2007

(54) METHOD FOR PRODUCING INFORMATION CARRIERS

(75) Inventor: Anders Berndtsson, Kullavik (SE)

(73) Assignee: Atlantic Zeiser GmbH, Emmingen (DE)

( * ) Notice: Subject to any disclaimer, the term of this patent is extended or adjusted under 35 U.S.C. 154(b) by 312 days.

(21) Appl. No.: 11/039,674

(22) Filed: Jan. 19, 2005

(65) Prior Publication Data
US 2005/0166391 A1 Aug. 4, 2005

(30) Foreign Application Priority Data
Jan. 31, 2004 (EP) .................................. 04002113

(51) Int. Cl.
*H01L 21/00* (2006.01)
(52) U.S. Cl. ...................... 438/106; 438/125; 156/297; 257/21.001
(58) Field of Classification Search ................ 438/106, 438/108; 156/297
See application file for complete search history.

(56) References Cited
U.S. PATENT DOCUMENTS
6,140,146 A * 10/2000 Brady et al. ................... 438/62

| 6,281,842 | B1 * | 8/2001 | Moren ................. 343/700 MS |
| 7,022,566 | B2 * | 4/2006 | Wong et al. ................. 438/228 |
| 2003/0064544 | A1 | 4/2003 | Heinemann et al. |
| 2003/0136503 | A1 | 7/2003 | Green et al. |
| 2004/0004295 | A1 | 1/2004 | Stromberg et al. |
| 2005/0130389 | A1 * | 6/2005 | Yamazaki et al. .......... 438/455 |
| 2006/0049995 | A1 * | 3/2006 | Imaoka et al. .............. 343/702 |

FOREIGN PATENT DOCUMENTS
WO 02/41387 A1 5/2002
WO 02/089051 A1 11/2002

* cited by examiner

*Primary Examiner*—Michael Lebentritt
*Assistant Examiner*—Angel Roman
(74) *Attorney, Agent, or Firm*—Michael J. Striker

(57) ABSTRACT

The invention relates to a method for producing information carriers (11), such as labels, tickets or the like, in particular contactless information carriers (11), which have integrated circuits (ICs, 30) and antennas (12, 13) connected to them, wherein antennas (12, 13) are formed at intervals one after the other on surface regions (27, 28) of a web (14), and moreover, one IC (30) provided per antenna (12, 13) is connected electrically conductively by its housing or its contacts (31, 32) to associated contact faces (33, 34) of the antenna (12) (FIG. 1).

38 Claims, 3 Drawing Sheets

METHOD FOR PRODUCING INFORMATION CARRIERS

BACKGROUND OF THE INVENTION

The invention relates to a method for producing information carriers, such as labels, tickets or the like.

In the production of such information carriers, the goal is as much as possible to accomplish this in a continuous run, economically effectively, with a high throughput per unit of time, preferably in an automated mode of operation.

SUMMARY OF THE INVENTIONS

This is attained according to the invention by a method having the characteristics of claim 1. Advantageous further characteristics of the invention and features of it will become apparent from the associated dependent claims. This method according to the invention makes it possible to produce information carriers, in particular contactless information carriers economically, for instance even in continuous operation, by avoiding cyclical operations, and in the process to generate very large numbers per unit of time.

DETAILED DESCRIPTION OF THE PREFERRED EMBODIMENTS

Figure 1:
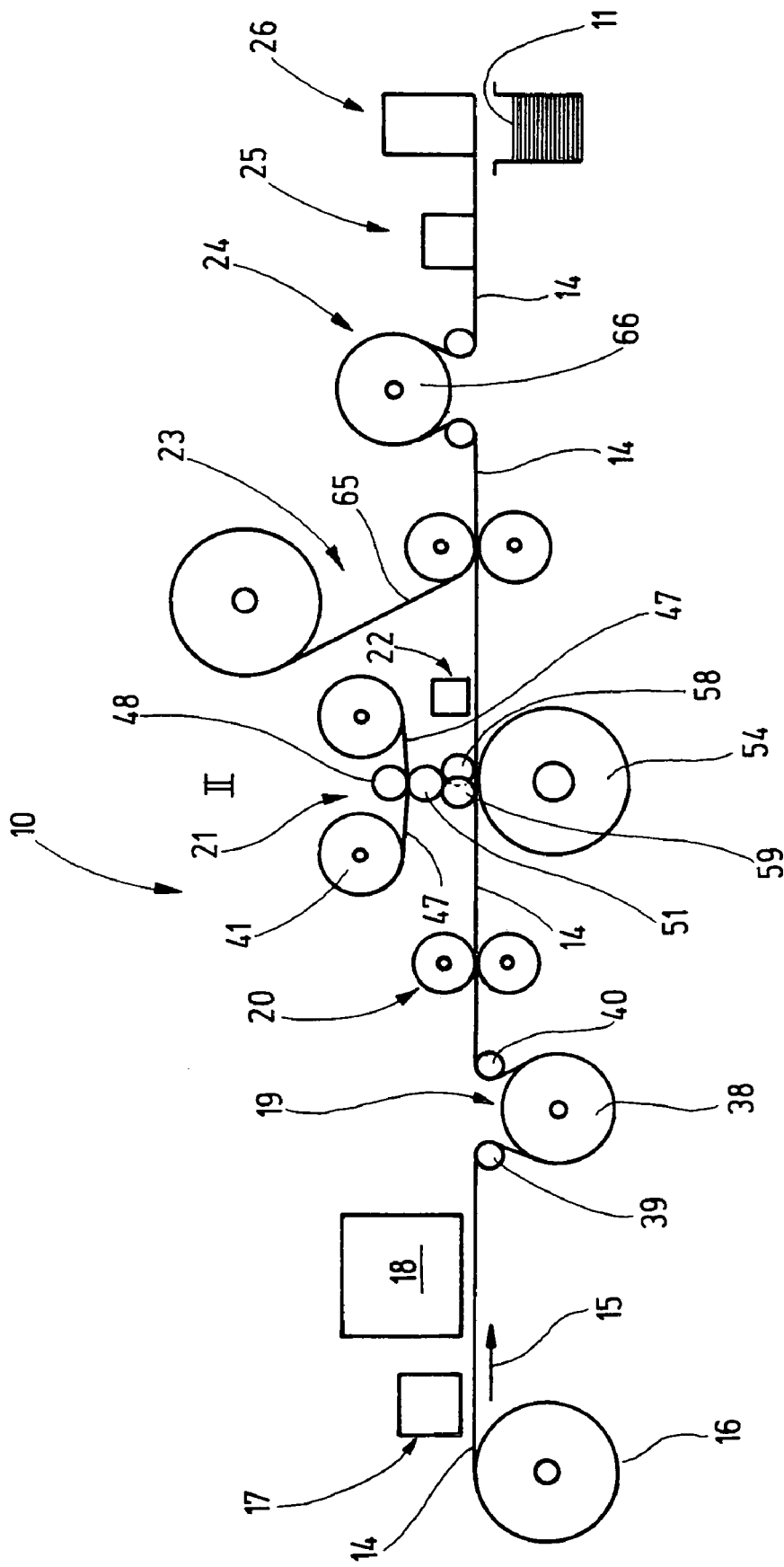
FIG. 1, a schematic side view of a system for producing information carriers.

A system 10 is schematically shown for producing information carriers 11, which may for instance comprise labels, tickets, or the like and may be of various materials, such as paper and/or plastic or the like. These information carriers 11 may preferably be contactless information carriers, which have only schematically shown integrated circuits 30 and antennas 12, 13 connected to the integrated circuits. Such information carriers 11 are produced for instance in a continuous run with a resultant high throughput by means of the system 10, beginning with a web 14 of paper and/or plastic or similar material. To that end, the system 10 has one or more stations or processing units, for instance one after the other in the travel direction of the web 14 indicated by the arrow 15, in which various treatments are performed. The web 14 comprises a striplike material originating in a roll 16 or similar form of storage, which is delivered for instance first to at least one processing unit 17 for printing, and after that, if necessary, for instance to at least one following processing unit 18 for drying or hardening, and after that for instance to at least one testing unit 19, which is followed for instance by at least one processing unit 20 for tin-plating or application of an adhesive, which is followed in turn for instance by at least one processing unit 21 for applying integrated circuits 30 (ICs). This is followed for instance by at least one processing unit 22 for making electrical connections or for hardening a conductive adhesive, after which is for instance at least one further processing unit 23 for applying at least one cover layer, which is adjoined by for instance at least one further processing unit 24 for communication with the chip, in particular for programming, initialization or personalization. This is followed for instance by at least one processing unit 25 for a surface treatment that may optionally be to be performed, which is adjoined by for instance at least one processing unit 26 for final processing of the completed information carriers 11.

It is understood that not all the individual processing units 17 through 26 need be provided, nor do they necessarily have to be provided in succession in the order listed. They may instead be transposed with one another in terms for instance of the direction in which the web is transported, indicated by the arrow 15, to the extent that this is required or useful for the process, or may be located separately and spatially at a distance and/or integrated with other systems. One or another processing unit may also be omitted. The system 10 may also be designed in multiple courses, in such a way that per station, a plurality of such processing units, for instance identical ones or designed differently, may be placed side by side.

Figure 3:
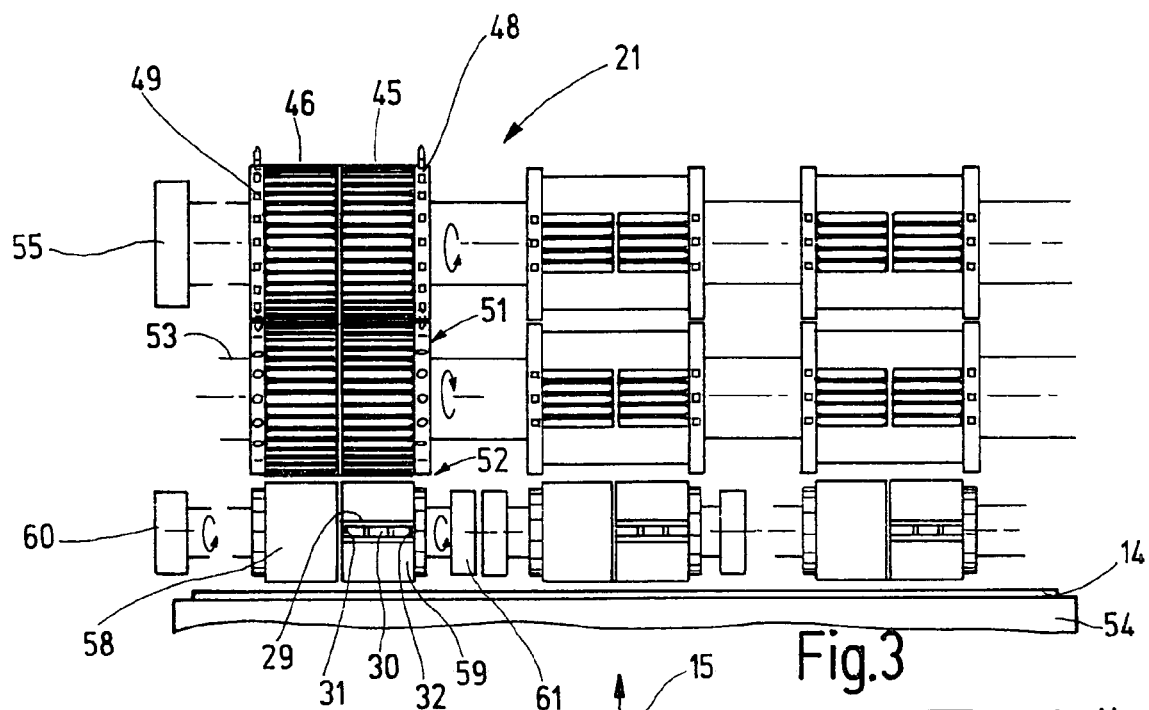
FIG. 3, a schematic side view in the direction of the arrow III in FIG. 2 of part of the detail shown there.
Figure 4:
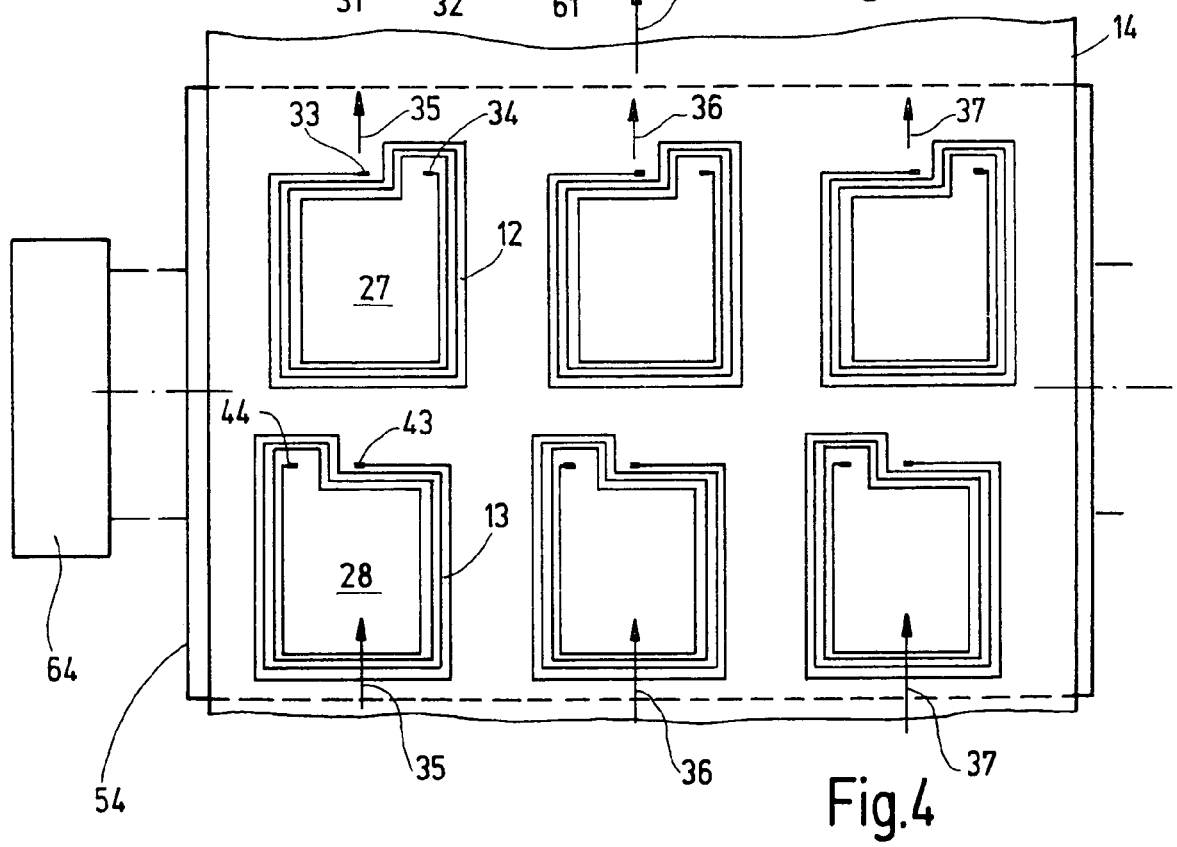
FIG. 4, a schematic plan view on a web that carries antennas, with a bottom conveyor roller for it.

The system 10 with the individual processing units 17 through 26 makes it possible to produce information carriers 11, in particular contactless information carriers 11, which have integrated circuits (ICs) 30, and in particular so-called flip-chip packages (FCPs) 29 provided with such ICs 30, and antennas 12, 13 connected to them; at intervals one after the other, antennas, as shown in FIG. 4 for the antennas 12 and 13, are formed on surface regions 27 and 28, respectively, of the web 14, and in addition, one IC 30 per antenna 12, 13 is connected electrically conductively by its housing, in particular the FCP 29, to associated contact faces of the respective antenna 12, 13. In FIG. 3, an IC 30 integrated with an FCP 29 is shown schematically, with which the antenna 12 in FIG. 4 is associated, and which on both sides has contacts 31, 32, extending horizontally away from and separately from the circuit (IC) 30 located in the middle; on being applied to the antenna 12, these contacts are connected electrically conductively by their contact faces 33 and 34, respectively.

In this production process, with the aid of the system 10 on the web 14, first the antennas 12, 13 and others are applied, for instance by printing, embossing, laying, transferral from a carrier, or the like. As one option, FIG. 1 shows those produced by printing by means of at least one processing unit 17. The at least one processing unit 17 can be designed such that the antennas 12, 13 and others are applied by printing with conductive ink, by the so-called DoD (Drop-on-Demand) method, or instead by screenprinting, for instance with conductive paste. FIG. 4 shows that the antennas 12, 13 and others are formed in an orientation such that their contact faces 33, 34 are located on a line extending transversely to the direction, indicated by the arrow 15, in which the web 15 is transported and are spaced apart from one another. This is also true for the other contact faces 43, 44 of the next antenna 13 in the direction of the arrow 15. The antennas 12, 13 and further ones follow at equal, regular intervals, one after the other in the transporting direction of the web 14 along at least one web lane, which with respect to the antennas 12, 13 is indicated schematically in FIG. 4 by reference numeral 35. FIG. 4 shows that along the web 14 in alternating succession, antennas of one antenna pattern and then next the antenna 13 with a different antenna pattern are formed, along the one web lane 35. The antennas 12, 13 differ in terms of the disposition of the contact faces. In the antenna 12, the left contact face 33 is located approximately at the level of the web lane 35 shown, while the other contact face 34 is horizontally spaced apart to the right of the web lane 35. For the next antenna 13, the contact faces 43, 44 are disposed in a mirror image of this, for example, such that one contact face 43 extends approximately at the level of the web lane 35 shown, while the other contact face 44 is spaced apart from it to the left. Thus per web lane 35, alternating antennas 12 of one antenna pattern and antennas 13 of the other antenna pattern are formed in the processing unit 17. Accordingly, these two antenna patterns are formed, in particular printed, for example, on the web 14 in constant alternation, specifically on the first web lane 35. This has the advantage later, when the individual antennas 12, 13, in the region of the at least one processing unit 21, are provided with ICs 30 and in particular ICs 30 integrated with FCPs 29, that right-hand FCs 29 can be applied to the antenna 12 and left-hand FCPs to the next antenna 13, and so on in constant alternation, in a continuous process.

As can be seen particularly from FIG. 4, by means of one processing unit 17 or a plurality of processing units 17 placed side by side, antennas corresponding to the antennas 12, 13 and further ones of the first web lane 35 can be formed, in particular being applied by printing or the like, on the web 14 along a plurality of side by side parallel web lanes 35, 36 and 37; to that end, the web 14 is moved past the at least one processing unit 17 in the transporting direction indicated by arrow 15. If necessary and/or if desired, the web 14, provided with the antennas 12, 13 and further ones of the individual web lanes 35, 36 and 37, is thereafter moved past at least one processing unit 18 for drying or hardening of the applied ink, paste or the like; this unit may for instance be embodied as a UV unit. The at least one processing unit 18 may also, depending on the design, be placed closer to the at least one processing unit 17, or even combined with it.

Alternatively, webs 14, for instance wound onto rolls, that are supplied already furnished with antennas 12, 13 may also be processed.

Next, the testing unit 19 can follow, which serves to monitor the applied antennas 12, 13 and others electrically, for which purpose the web 14 is moved with the antennas 12, 13 on it past this at least one testing unit 19. The testing unit 19 has for instance one drum 38 preceded and followed by deflection rollers 39, 40. The at least one drum 38 has, for instance on its circumferential surface, test contacts, such as measuring pins, which communicate with a power supply and testing system, not further shown, for measuring individual characteristic values of the antennas 12, 13 and others, such as their conductivity, inductance, or the like. With the antennas 12, 13 and further ones on it, the web 14 is made to travel around the at least one drum 38, whereupon the test contacts of the drum 38 come into conductive contact with the contact faces 33, 34 and 43, 44 and others of the antennas 12, 13 and others, so that the function testing of the antennas 12, 13 can be performed automatically.

Figure 2:
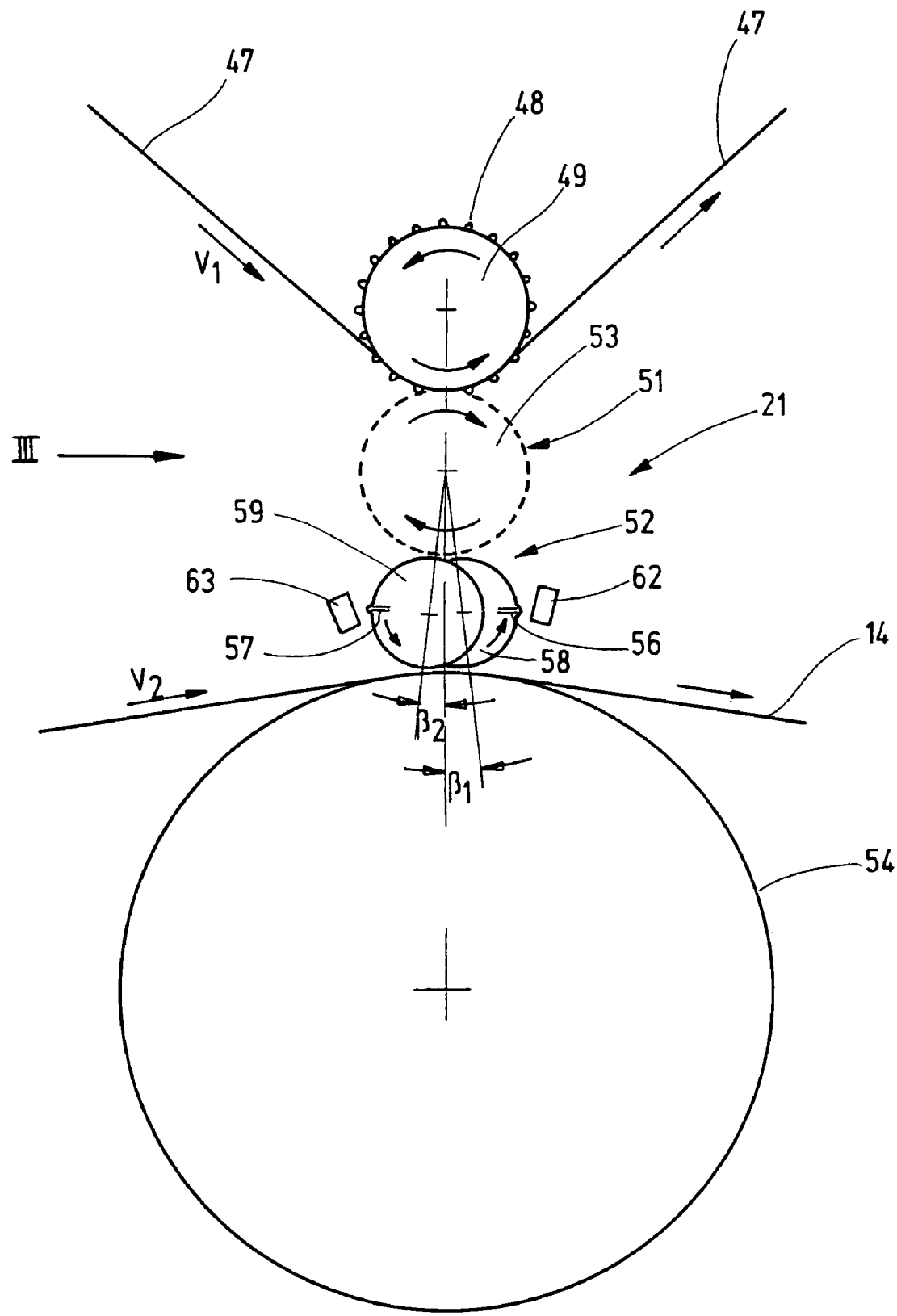
FIG. 2, a schematic side view of a detail II in FIG. 1, on a larger scale.

Next, the web 14, with the antennas 12, 13 and further ones on it, is delivered to the at least one processing unit 20, in which at least the contact faces 33, 34 and 43, 44 of the antennas 12, 13, respectively, are prepared for being put into electrical contact with the contacts 31, 32 and further contacts of the ICs 30, in particular ICs integrated with FCPs 29. For this purpose, the at least one processing unit 20 is embodied for instance for tin-plating the contact faces 33, 34 and 43, 44 of the antennas 12, 13. In addition to this, or instead, the at least one processing unit 20 may also be embodied for applying a conductive or anisotropic adhesive to the contact faces 33, 34 and 43, 44 of the antennas 12, 13. In that case, it may be advantageous if the at least one processing unit 20 has a device for applying adhesive spots or a drum with an adhesive spot pattern on it. The web 14 may also be furnished having been prepared in this way. It is then delivered to the at least one processing unit 21, in which the antennas 12, 13 can be provided with ICs 30 of a conventional kind. The ICs are delivered, preferably at regular intervals one after the other, from a supply such as a belt, chain or similar carrier and are fed onto the web 14, specifically in the region of the contact faces of the antennas, and this is done in a continuous or discontinuous run, such as a cyclical run. In the exemplary embodiment shown, conversely, in the at least one processing unit 21, so-called flip-chip packages 29 (FCPs) with integrated ICs 30 furnished on at least one roll 41 can be processed in such a way that they are fed in a continuous run onto the web 14, in the region of a line extending approximately transversely to the transport direction indicated by arrow 15, this line having the contact faces 33, 34 and 43, 44 of respective antennas 12 and 13, to the surface regions 27 and 28 in the region of the contact faces 33, 34 and 43, 44. For each of the web lanes 35, 36 and 37 of the web 14, in the processing unit 21, a roll 41 provided with such FCPs 29 is provided, and per roll 41, the FCPs 29 are present preferably in two parallel lanes extending side by side and spaced apart, which are indicated schematically in FIG. 3 by reference numerals 45 and 46 for the first web lane 35. Thus one roll 41 has FCPs 29 disposed side by side in two lanes 45, 46. These FCPs 29 are the kind that are disposed individually at regular intervals one after the other on each lane 45, 46 on a transport strip 47 and are retained thereon as well as held to one another by means of backing strips preferably adhering to the back side thereof. Each transport strip 47 carrying FCPs 29 disposed in preferably two parallel lanes 45 and 46 is deflected by means of at least one associated transporting device 48, in particular in the form of a transporting drum 49, by means of which the individual FCPs 29 are severed from the transport strip 47 and backing strip by punching the transporting device 48 with a punching tool in such a way that the backing strip, which connects the individual FCPs 29 to one another and to the transport strip 47, is cut apart transversely to the transport direction. After the separation from the transport strip 47 and backing strip, the FCPs 29, maintaining the same spacing from one another per lane 45 and 46, are taken over by at least one intermediate holding device 51 and are taken from the intermediate holding device 51 by means of at least one transfer device 52 cooperating with it and transferred onto the web 14 that carries the antennas 12, 13 and further antennas as well. The at least one intermediate holding device 51, for instance analogously to the at least one transporting device 48, has a two-lane intermediate drum 53, which in the same way as the transporting drum 49 does for forming the two lanes 45, 46, has two parallel, spaced-apart, side by side circumferential surfaces for two associated lanes of FCPs 29. The transporting device 48, and in particular the individual transporting drums 49, have protrusions, such as pins, on both circumferential edges, that engage corresponding perforated edges of the transport strip 47 and that if desired can also engage circumferential perforations on the applicable intermediate drum 53. The at least one intermediate holding device 51, in particular the intermediate drum 53, is provided with suction devices, not further shown, for firmly holding the individual FCPs 29, which have been taken over from the transporting device 48, on the drum circumference. The suction device is represented by interruptions in the circumference of the intermediate drum 53. In this way, the FCPs 29 are securely held on the intermediate drum 53 at equal intervals from one another along the two lanes 45, 46. The at least one transporting drum 49 and the at least one intermediate drum 53 rest with their centers on a common connecting line, extending vertically in FIG. 2, and are at least essentially in mutual contact with one another. Both of them are driven in opposite directions at the same rpm, and the transport strip 27 is passed between them and the individual FCPs 29 are cut off from the transport strip 47 and transferred to the at least intermediate drum 53, where they are held by suction. The at least one transporting device 48, in particular a transporting drum 49, is driven at the same speed v1 as the at least one intermediate holding device 51, in particular an intermediate drum 53. The at least one web 14 is moved forward at a speed v2, which is greater and specifically considerably greater than the speed v1 of the at least one intermediate holding device 51, in particular the intermediate drum 53, by means of a conveyor belt, not shown, or by means of a roll 54 that is shown, at a spacing from the transporting device 48 and the intermediate holding device 51, in particular being moved below them. This speed v2 is greater for instance by the factor b than the speed v1 of the at least one intermediate holding device 51; the factor b is ascertained from the ratio of the spacings of two antennas 12 of the same antenna pattern from one another on a web lane 35 and the spacing of the FCPs 29 on the transport strip 47. The at least one transporting drum 49 and the at least one intermediate drum 53 are driven jointly by means of a servo motor 55, in particular a stepping motor.

In the at least one processing unit 21, the FCPs 29 are thus continuously and successively separated by severing of the backing strip that joins them together and adheres to the transport strip 47, and they are each fed onto the web 14 in the region of a line that extends approximately transversely to the transport direction of the web and that has the contact faces 33, 34 and 43, 44 of respective antennas 12, 13. If one looks for instance at the FCP 29 that is visible in FIG. 3 on the right-hand lane 45 in the transfer device 52, this FCP is pressed with its contacts 31, 32 onto the contact faces 33, 34 of the antenna 12 and electrically conductively connected to them. The pressing is done for instance by means of pins, only suggested in FIG. 2, of which there are two pins 57 and 56 per lane 45, 46, respectively. In this particular example, two pins 57 of the transfer device 52 of the right-hand lane 45 press on the contacts 31, 32 of the FCP 29 and as a result press these contacts against the associated contact faces 33, 34 of the antenna 12. The individual FCPs 29 can be secured by their contacts 31, 32 to the contact faces 33, 34 of the antennas 12, for instance by crimping, soldering, welding, adhesive bonding, or in some other known way. The individual FCPs 29 may have tin-plated contacts 31, 32. When an FCP 29 is transferred from the transfer device 52, on the right-hand lane 45, to the antenna 12 and the electrical contact is made at the contact faces 33, 34, the respective FCPs 29 extend in bridgelike fashion beyond the winding region of the particular antenna 12.

The arrangement is made such that when there are FCPs 29 in two parallel lanes 45, 46 extending side by side and spaced apart and there is one web lane 35 with an antenna pattern differing from one antenna 12 to the next antenna 13, with contact faces, one antenna 12 is provided with an FCP 29 of one lane 45, and the next antenna 13 is provided with an FCP of the other lane, the lane 46 on the left in FIG. 3, and so on in chronological succession and in constant alternation. As a result, it is attained that in a continuous run, an FCP 29 of one lane 45 can be connected by its contacts 31, 32 to the associated contact faces 33, 34 of one antenna 12 of one antenna pattern of one web lane 35, and the next FCP on the other lane, the left-hand lane 46 in FIG. 3, can be connected by its contacts to the associated contact faces 43, 44 of the next antenna 13 of a different antenna pattern on the same web lane 35.

Since the at least one intermediate holding device 51 revolves at the speed v1, which is thus less than the speed v2 of the web 14 in the region of the roll 54, the at least one transfer device 52, after taking over an FCP 29 from the associated intermediate holding device 51, is accelerated to the speed v2, at which the web 14 is moved forward in the direction 15 in which it is transported, and after giving up an FCP 29 to the web 14 is decelerated again to the speed v1 of the intermediate holding device 51. Per lane 45, 46, the at least one transfer device 52 has one revolvingly driven wheel 59 and 58, respectively, which are each provided with a suction device, not further shown, for firmly holding the individual FCPs 29, taken over from the intermediate holding device 51, and moreover is provided with the respective two pins 57 and 56 each at a circumferential point; the pins can be extended, for instance under cam control, and can press against the contacts 31, 32 of the FCPs 29 and as a result press the FCPs 29, by their contacts 31, 32, against the respective associated contact face 33, 34 of the associated antenna 12. As a result, it is attained that the FCPs 29 are loaded only in spots, and it is assured that any adhesive applied will not contaminate other regions of the system 10. For instance, if an electrically conductive adhesive has been applied for making electrical contact in the processing unit 20, then the contacts 31, 32 are pressed by the respective pins 57 and 56 into the applied adhesive only approximately in pointwise form. The pins 57, 56 comprise needles, for instance. The cam control for them can be located in the interior of the respective wheel 58, 59. As can be seen from FIG. 2, the two pins 57 of the wheel 59 are offset by a circumferential angle of approximately 180° from the pins 56 of the other wheel 58, assuming the theoretical case of a coaxial arrangement of the two wheels 58, 59. In fact, at least one wheel 58, 59 of the at least one transfer device 52 is offset with its center axis relative to the center axis of the at least one intermediate holding device 51, in particular the intermediate drum 53, by an angle $\beta 1$ and $\beta 2$, respectively. If two wheels 58, 59 are provided, then for instance one wheel 58 of the transfer device 52 is offset forward by its center axis relative to the center axis of the intermediate holding device 51, in particular the intermediate drum 53, by an angle $\beta 1$ in the circumferential direction, while the other wheel 59 of the transfer device 52 is offset to the rear with its center axis relative to the center axis of the intermediate holding device 51, in particular the intermediate drum 53, by an angle $\beta 2$ in the circumferential direction, in such a way that first one wheel 58 takes on one FCP 29 of the one lane 46, and later, the other wheel 59 takes on one FCP 29 of the other lane 45 from the intermediate holding device 51. In terms of the offset of each of the wheels 58, 59, the offset angle of each wheel 58, 59 of the transfer device 52 is selected to be equal. For instance, it amounts to one-quarter the circumferential spacing of the FCPs 29 in each lane 45 and 46 from one another. If the spacing of the individual FCPs 29 per lane 45, 46 is 9° of circumference, for instance, then the respective offset angle $\beta$ is 2.25°, for instance.

The at least one transfer device 52 with the two wheels 58, 59 makes it possible, in a continuous run, for an FCP 29 taken over by one wheel 59 to be transferred from one lane 45 to the antenna 12 of one antenna pattern of one web lane 35 and after that, by the other wheel 58, for an FCP 29 of the other lane 46 to be transferred to the next antenna 13 of a different antenna pattern in the same web lane 35, in alternating succession. Accordingly, FCPs 29 on the right and on the left are applied in alternation in a continuous run, without requiring that the transport strip 47, which carries the FCPs of both lanes 45, 46, be switched alternately back and forth in the transverse direction. Because of the continuous run attained, high speeds for v2 are possible, and as a result, the system 10 makes a very high throughput in the production of individual information carriers 11 possible. The wheels 58, 59 of the at least one transfer device 52 are each driven in the same direction of rotation by means of mutually independent servo motors 60 and 61, in particular stepping motors, which are synchronized in terms of their phase relationship, and the circumferential speeds are phase-offset by 180°, plus the offset angle 2β. The transfer of the FCPs 29 to the antennas 12, 13 of one web lane 35 can be monitored by means of at least one camera 62, 63, of which each camera is assigned for instance to one web lane 45 and 46 and can be disposed approximately at the level of the middle of each wheel 58, 59. All the servo motors 55, 60, 61 and further ones are controlled as a function of the speed v2 of the web 14 and are synchronized with it. The roll 54 can likewise be driven by means of a servo motor 64, in particular a stepping motor.

Particularly from FIGS. 3 and 4, it can be seen that an arrangement described above for one web lane 35 can also be provided for both further web lanes 36 and 37. The transporting devices 48, parallel to one another, can all be driven by a single servo motor 55 at the speed v1; the intermediate holding devices 51 cooperating with it and parallel to one another are also then driven at the same speed. The various transfer devices 52 associated with and parallel to one another are also designed in the same way and operate in the same way as has been described above for those of the web lane 35 on the left.

In FIG. 1, at least one processing unit 22 is shown, only schematically, that makes it possible for the ICs 30, in particular integrated with FCPs 29, that are applied to the antennas 12, 13 of one web lane 35 to be connected electrically conductively by their contacts 31, 32 to the associated contact faces 33, 34 and 43, 44 of the respective antennas 12, 13 if necessary, for instance by crimping, soldering, welding, adhesive bonding, or some other known way. Hardening of an electrically conductive adhesive can also be done in this processing unit 22.

After that, the web 14 carrying the antennas 12, 13 and further ones and applied FCPs 29, is moved past at least one further processing unit 23, in which at least one side of the web, for instance its top and/or underside, and at least its surface regions 27, 28 that carry the various antennas 12, 13 and ICs 30, in particular ICs that are integrated with the FCPs 29, are provided with at least one single- or multi-layer cover layer 65, such as an upper and/or lower ply of the web. One or more layers of the cover layer 65 may be recessed at the particular point of the ICs 30, in particular FCPs 29, which averts the risk of any damage to the ICs 30, in particular FCPs 29, upon application and additionally protects the ICs 30, in particular FCPs 29. The cover layer 65 may be secured to the top side of the web 14 by adhesive bonding, for instance. It is embodied for instance as a self-adhesive layer.

After that, the individual ICs 30, in particular integrated with the FCPs 29, on the web 14 are processed, for instance initialized or personalized, by communication between them and at least one control unit, not shown. This is done in the at least one processing unit 24, which has for instance at least one carrier with a curved web in the form of a revolvingly driven drum 66, around which the web 14 with the ICs 30, in particular integrated with the FCPs 29, is guided and in the process is in communication with at least one communication means for processing, such as initialization or personalization. The ICs 30, in particular integrated with the FCPs 29, are held, during a predetermined time and/or distance that suffices for the processing, in a constant relative position with the at least one communication means of the drum 66 without relative motion to one another and are processed, for instance initialized or personalized, during this phase.

If desired, next, the web 14 that carries the antennas 12, 13 and the applied ICs 30, in particular integrated with the FCPs 29, is moved past at least one further processing unit 25, in which surface processing, in particular graphic processing, for instance, is done, for instance by means of printing, laser processing, or the like. Next, the web 14 carrying the antennas 12, 13 and the applied ICs 30, in particular integrated with the FCPs 29, is moved past at least one further processing unit 26, in which final processing is done, for instance in the form of coiling up and/or cutting and/or bundling and/or packaging and/or banding or the like. At the end of this process, the contactless information carriers 11 are the result, which can be produced at high speed in a continuous run, achieving very high numbers of units per unit of time, by means of the system 10. This system makes it possible to process ICs 30, in particular integrated with FCPs 29 and provided on two lanes 45, 46, effectively, quickly, and highly economically.

By means of the method of the invention, instead of the FCPs 29 with ICs 30 integrated with them, it is also possible for conventional ICs 30 to be applied, joined to the antennas 12, 13, and further processed in any other way.

The invention claimed is:

1. A method for producing information carriers (11), which have integrated circuits (ICs, 30) and antennas (12, 13) connected to them, wherein on surface regions (27, 28) of a web (14) along at least one web lane (35, 36, 37), antennas (12, 13) are applied to the web (14) in succession at regular intervals from one another, and moreover one IC (30) per antenna (12, 13) is connected electrically conductively by its housing or its contacts (31, 32) to associated contact faces (33, 34) of the antenna (12), and wherein, in alternating sequence for the antennas (12, 13) of one web lane (35), the antenna pattern with contact faces (33, 34) of one antenna (12) is different from the antenna pattern with contact faces (43, 44) of the next antenna (13) in this web lane (35).

2. A method for producing information carriers (11) of claim 1, in which as integrated circuits (ICs 30), Ics (30) integrated with so-called flip-chip packages (FCPs, 29) are provided, which are provided with separate or housing-mounted contacts (31, 32), which are disposed individually in succession at regular intervals from one another, on a transport strip (47) and are held thereon and among one another by means of backing strips adhering to the transport strip (47)

wherein the FCPs (29) are continuously and successively separated from the transport strip (47) and backing strip and delivered respectively to the web (14) in the region of a line, extending approximately transversely to the transport direction of the web (14) and having the contact faces (33, 34 and 43, 44) of respective antennas (12, 13).

3. The method of claim 1,
wherein
the individual ICs (30), of the antennas (12) are pressed onto the contact faces (33, 34) by of extensible and for instance cam-controlled pins (56, 57) pressing on their contacts (31, 32).

4. The method of claim 1,
wherein
when FCPs (29) are present at least in two parallel lanes (45, 46) extending side by side in spaced-apart fashion and at least one web lane (35) with an antenna pattern that changes from one antenna (12) to the next antenna (13) and has contact faces (33, 34 and 43, 44), in continuous succession one antenna (12) is provided with an FCP (29) of one lane (45) and the next antenna (13) is provided with an FCP (29) of the other lane (46), in constant alternation.

5. The method of claim 4,
wherein
in a continuous run, an FCP (29) of one lane (45) can be connected by its contacts (31, 32) to the associated contact faces (33, 34) of an antenna (12) of an antenna pattern of a web lane (35), and a next FCP (29) of the other lane (46) can be connected by its contacts to the associated contact faces (43, 44) of the next antenna (13) of a different antenna pattern on the same web lane (35).

6. The method of claim 1,
characterized in that
the FCPs (29), after a separation from a transport strip (47) and a backing strip, are taken over by at least one intermediate holding device (51) and are removed from the intermediate holding device (51) by means of at least one transfer device (52) and transferred to the web (14) that carries the antennas (12, 13).

7. The method of claim 2,
wherein
the transport strip (47) with FCPs (29) (45, 46) is deflected by means of at least one transporting device (48), and the FCPs (29) are cut off from a backing strip and thus from a transport strip (47) by means of at least one punching tool of the transporting device (48) and are taken over by the at least one intermediate holding device (51).

8. The method of claim 6,
wherein
the at least one intermediate holding device (51) has an intermediate drum (53), which is provided with suction devices for firmly holding the individual FCPs (29), taken over from the at least one transporting device (48), on the drum circumference.

9. The method of claim 8,
wherein
the at least one transporting drum (49) and the at least one intermediate drum (53) are located with their centers on a common connecting line and are at least substantially in contact with one another.

10. The method of claim 8,
wherein
the at least one transporting drum (49) and the at least one intermediate drum (53) revolve at the same rpm in opposite directions from one another.

11. The method of claim 8,
wherein
the at least one transporting drum (49) and the at least one intermediate drum (53) each have two circumferential surfaces, extending side by side and spaced apart, for associated two lanes (45, 46) of FCPs (29).

12. The method of claim 6,
wherein
the at least one transfer device (52), after taking over an FCP (29) from the associated intermediate holding device (51), is speeded up to a higher speed v2, at which the web (14) is moved forward in the transporting direction, and after an FOP (29) has been delivered to the web (14), the transfer device is decelerated again to the lesser speed v1 of the at least one intermediate holding device (51).

13. The method of claim 6,
wherein
the at least one transfer device (52), has one wheel (59 and 58, respectively), which is driven to revolve, per lane (45, 46) with FCPs (29), each wheel being provided, at a circumferential point, with a suction device for firmly holding the individual FCPs (29) taken over from the intermediate holding device (51) and with two extensible and for instance cam-controlled pins (56), (57) pressing onto the contacts (31, 32) of the FCPs (29), by means of which pins the contacts (31, 32) of the FCPs (29) are pressed onto the contact faces (33, 34 and 43, 44) of the associated antennas (12, 13).

14. The method of claim 13,
wherein
the pins (56) of one wheel (58) are offset from the pins (57) of the other wheel (59) of the at least one transfer device (52) by a circumferential angle of approximately 180°.

15. The method of claim 13,
wherein
at least one wheel (58, 59) of the at least one transfer device (52) is disposed with its center axis offset relative to the center axis of the intermediate holding device (51) by an angle β in the circumferential direction.

16. The method of one of claims 13 through 15,
wherein
the one wheel (58) of the at least one transfer device (52) is disposed with its center axis offset forward relative to the center axis of the intermediate holding device (51), by an angle β1 in a circumferential direction, and the other wheel (59) of the at least one transfer device (52) is disposed with its center axis offset rearward relative to the center axis of the intermediate holding device (51), by an angle β2 in the circumferential direction, in such a way that in alternation, first the one wheel (58) takes over an FCP (29) of the one lane (46) and after that the other wheel (59) takes over an FCP (29) of the other lane (45) from the intermediate holding device (51).

17. The method of claim 16,
wherein
the offset angle β of each wheel (58, 59) of the at least one transfer device (52) is the same size.

18. The method of claim 16,
wherein
the offset angle β of each wheel (58, 59) of the at least one transfer device (52) amounts at least approximately to one-quarter a spacing of the FCPs (29) of each lane (45, 46) from one another.

19. The method of claim 6,
wherein
in a continuous run, an FCP (29) of one lane (46), taken over by one wheel (58) of the at least one transfer device (52), is transferred to an antenna (13) of an antenna pattern of a web lane (35), and after that, an FCP (29) of the other lane (45), taken over by the other wheel (59) of the transfer device (52), is transferred to a next antenna (12) of a different antenna pattern on the same web lane (35), and this is done in alternating succession.

20. The method of claim 6, wherein
the wheels (58, 59) of the at least one transfer device (52) are driven with circumferential speeds that are phase-offset from one another by 180°, plus the offset angle 2β.

21. The method of claim 7, wherein
the at least one transporting device (48), revolves and is driven at the same speed v1 as the at least one intermediate holding device (51).

22. The method of claim 1, wherein
the at least one web (14) is moved forward by means of a conveyor belt, roller (54) or the like at a speed v2 that is greater than the speed v1 of the at least one intermediate holding device (51).

23. The method of claim 22, wherein
the speed v2 of at least one web (14) is greater by the factor b than the speed v1 of the at least one intermediate holding device (51), and the factor b is ascertained from the ratio of the spacings of two antennas (12) of the same antenna pattern of one web lane (35) and the spacing of the FCPs (29) on the transport strip (47).

24. The method of claim 7, wherein
the at least one transporting drum (49) and the least one intermediate drum (53) are driven by means of a servo motor (55).

25. The method of claim 15, wherein
the two wheels (58, 59) of the at least one transfer device (52) are each driven by means of servo motors (60, 61) that are independent of one another and whose phase relationship is synchronized.

26. The method of claim 24, wherein
all the servo motors (55, 60, 61) are controlled as a function of the speed v2 of the web (14) and are synchronized with it.

27. The method of claim 1, wherein
the transfer of the FCPs (29) to the antennas (12, 13) of one web lane (35) is monitored by means of at least one camera (62, 63).

28. A method of producing information carriers (11), wherein the carriers are carriers selected from the group consisting of labels and tickets.

29. A method as defined in claim 1, wherein the information carriers are contactless information carriers.

30. A method as defined in claim 1, wherein the antenna pattern with contact faces (33, 34) of one antenna (12) is different from the antenna pattern with contact faces (43, 44) of the next antenna (13) in this web lane (35), being a mirror image of it in left-to-right arrangement.

31. A method as defined in claim 2, wherein the separate or housing-mounted contacts (31, 32) are disposed on the transport strip (47) in at least two parallel lanes (45, 47) extending side-by-side in spaced-apart fashion.

32. A method as defined in claim 3, wherein the individual ICs (30) are integrated with so-called flip-chip packages (FCPs 29).

33. A method as defined in claim 7, wherein FCPs (29) are disposed in two parallel lanes.

34. A method as defined in claim 7, wherein the at least one transporting device (48) is configured as a transporting drum (49).

35. A method as defined in claim 15, wherein the intermediate holding device (51) is configured as an intermediate drum (53).

36. A method as defined in claim 21, wherein the at least one transporting device (48) is configured as a transporting drum (49) and the at least one intermediate holding device (51) is configured as an intermediate drum (53).

37. A method as defined in claim 24, wherein the servo-motor (55) is configured as a stepping motor.

38. A method as defined in claim 25, wherein the servo-motors (60, 61) are stepping motors.

* * * * *